US006945023B2

United States Patent
Vandewalle et al.

(10) Patent No.: US 6,945,023 B2
(45) Date of Patent: Sep. 20, 2005

(54) SHIELDING MEANS FOR AN ELEVATOR OF AN AGRICULTURAL HARVESTING MACHINE

(75) Inventors: Rudy P. A. Vandewalle, Zedelgem (BE); Geert Claeys, Sint-Michiels (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/476,060

(22) PCT Filed: Apr. 29, 2002

(86) PCT No.: PCT/EP02/04959

§ 371 (c)(1),
(2), (4) Date: Oct. 27, 2003

(87) PCT Pub. No.: WO02/087311

PCT Pub. Date: Nov. 7, 2002

(65) Prior Publication Data

US 2004/0128967 A1 Jul. 8, 2004

(30) Foreign Application Priority Data

Apr. 30, 2001 (GB) .............................. 0110516

(51) Int. Cl.[7] .............................................. A01D 87/00
(52) U.S. Cl. ..................................................... 56/344
(58) Field of Search ........................... 56/344; 460/114; 198/725

(56) References Cited

U.S. PATENT DOCUMENTS

| 2,696,290 | A | | 12/1954 | Carroll |
| 3,678,677 | A | * | 7/1972 | Miller et al. ............... 56/327.1 |
| 3,690,049 | A | * | 9/1972 | Roberson et al. ............ 56/13.9 |
| 3,785,472 | A | | 1/1974 | Matthews ................... 198/171 |
| 5,976,013 | A | | 11/1999 | Hamann ..................... 460/114 |

FOREIGN PATENT DOCUMENTS

| DE | 1043204 | 11/1958 |
| DE | 9205617 | 7/1992 |
| DE | 4132246 | 4/1993 |

* cited by examiner

Primary Examiner—Thomas B. Will
Assistant Examiner—Alicia Torres
(74) Attorney, Agent, or Firm—Rebecca Henkel; Brant T. Maurer

(57) ABSTRACT

An agricultural harvesting machine comprises crop processing mechanism and an elevator assembly for conveying harvested crop material to said crop processing mechanism. The elevator assembly comprises an elevator housing and endless elevator mechanism mounted for rotation in said housing over a shaft. An outer and an inner shaft shielding plate are mounted around the shaft for preventing migration of crop material to said shaft. The inner plate is mounted within the outer shielding plate.

4 Claims, 4 Drawing Sheets

SHIELDING MEANS FOR AN ELEVATOR OF AN AGRICULTURAL HARVESTING MACHINE

FIELD OF INVENTION

The present invention relates to an elevator for an agricultural harvesting machine which is equipped for collecting crop material from a field and processing the same. In particular, it relates to the elevator which conveys the collected crop to the crop processingmechanism.

BACKGROUND OF INVENTION

Agricultural harvesting machines such as combine harvesters generally are developed to handle a large variety of crops. For example a combine harvester may be used to harvest small grain crops such as wheat and rye, rape or grass seed or large grain crops such as peas or corn. In this manner the use of the harvester, which is a high investment tool, can be extended over a longer season.

Conventionally the harvester is equipped with a detachable crop collecting attachment, such as a grain or corn header, which cuts the stems of the crop standing in the field and conveys the same to the inlet of an elevator housing. Alternatively crop which has been cut previously can be lifted up from the field by a pick-up attachment and conveyed to the same inlet. Elevator mechanism, commonly a chain elevator with transverse slats, grab the collected crop deposited in front of the inlet and convey it rearwardly and upwardly towards the crop processing mechanism, conventionally a threshing drum and concave or grate assembly.

As illustrated by U.S. Pat. No. 3,758,472, the crop usually is engaged by the lower run of the chain elevator to transport it along a bottom plate of the elevator housing. The upper run is shielded from the lower run by a backing plate which extends between the front and rear transverse shafts of the elevator. This plate reduces the chances that material which was not removed from the elevator by the threshing system, falls back on top of the lower run and gets lodged between the chains and the sprockets driving the chains near the exit of the elevator. The backing plate equally provides additional support for the upper run of the chains.

The front shaft may also be provided with dedicated anti-wrapping mechanism as shown in DE-U-92 05 617. Herein a set of curved plates is mounted over the front shaft of the elevator, between the elevator sprockets. These plates do not constitute a closed surface: triangular openings are provided behind the sprockets for allowing passage of the sprocket teeth and of any material which got trapped between the teeth. However crop material can enter through these openings and accumulate in the area around the shaft. Eventually this material will wrap around the shaft and start impeding its rotation.

Hence there is a need for an elevator structure which effectively keeps stray crop material from wrapping around the shaft without restraining the rotation of the sprocket teeth.

SUMMARY OF INVENTION

According to the present invention, there is provided an agricultural harvesting machine comprising crop processing mechanism and an elevator assembly for conveying harvested crop material to said crop processing mechanism, said elevator assembly comprising an elevator housing, endless elevator mechanism mounted for rotation in said housing over a shaft; and an outer shaft shielding plate mounted over said shaft for preventing migration f crop material to sad shaft, and wherein said elevator assembly further comprises an inner shaft shielding plate mounted within said outer shielding plate.

In this manner the shaft is shielded from two sides, such that stray crop material cannot reach the rotating shaft and gets wrapped around its surface.

The outer plate may have a substantially U-shaped cross section and the inner shaft a substantially W-shaped cross section. The shaft may then be rotated in the area between the bottom of the U and the middle, concave portion of the W.

Preferably, the plates together form a substantially cylindrical chamber around the shaft.

Advantageously, the outer and inner shielding plates may be attached to a transverse member of the elevator housing. They can be attached simultaneously by a common bolt or bolts.

BRIEF DESCRIPTION OF DRAWINGS

An agricultural harvester in accordance with the present invention will now be described in greater detail, by way of example, with reference to the accompanying drawings in which.

DETAILED DESCRIPTION OF THE PREFERRED EMBODIMENTS

The terms "grain", "straw" and "tailings" are used principally throughout this specification for convenience but it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are usually determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
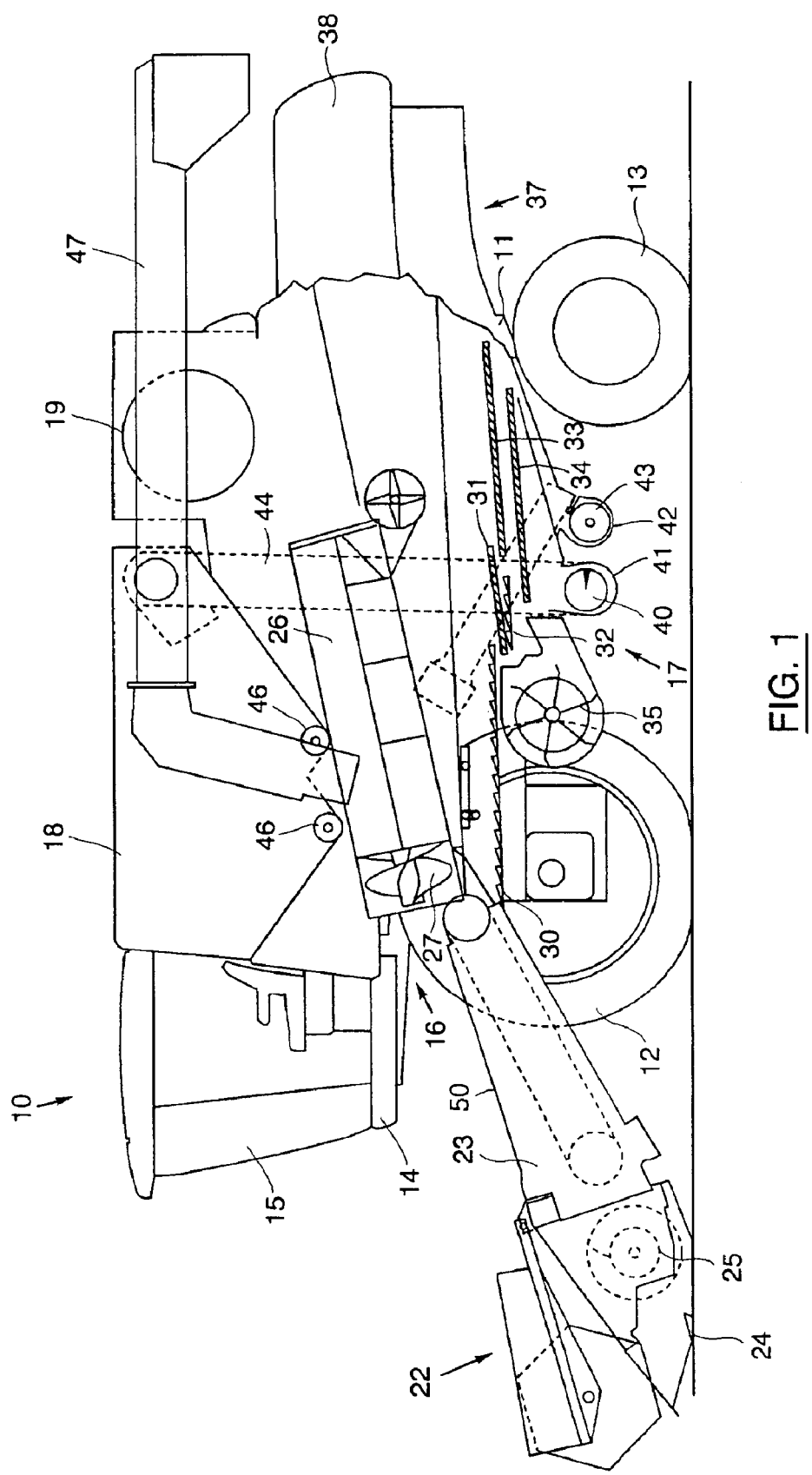
FIG. 1 is a diagrammatic, partly sectional side view of a combine harvester having a forwardly extending straw elevator.

The combine harvester 10 shown in FIG. 1 of the accompanying drawings, is of the axial-flow type, wherein crop material is threshed and separated while it is advanced by and along a longitudinally arranged rotor 27. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional grain header 22 and a straw elevator assembly 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22 and delivered by a header auger 25 to the inlet of the straw elevator assembly 23, which supplies the cut crop to the threshing and separating assembly 16.

The threshing and separating assembly 16 comprises a generally cylindrical chamber 26 in which a rotor 27 is rotated to thresh and separate the crop received therein, that is to say, the crop is rubbed and beaten between the rotors 27 and the inner surfaces of the chambers 26, whereby the grain, seed or the like, is loosened and separated from the straw.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35. The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor 45 to the cleaning assembly 17 for repeated cleaning action.

A pair of grain tank augers 46 at the bottom of the grain tank 18 is used to urge the clean grain sideways to an unloading tube 47 for discharge from the combine harvester 10.

Figure 2:
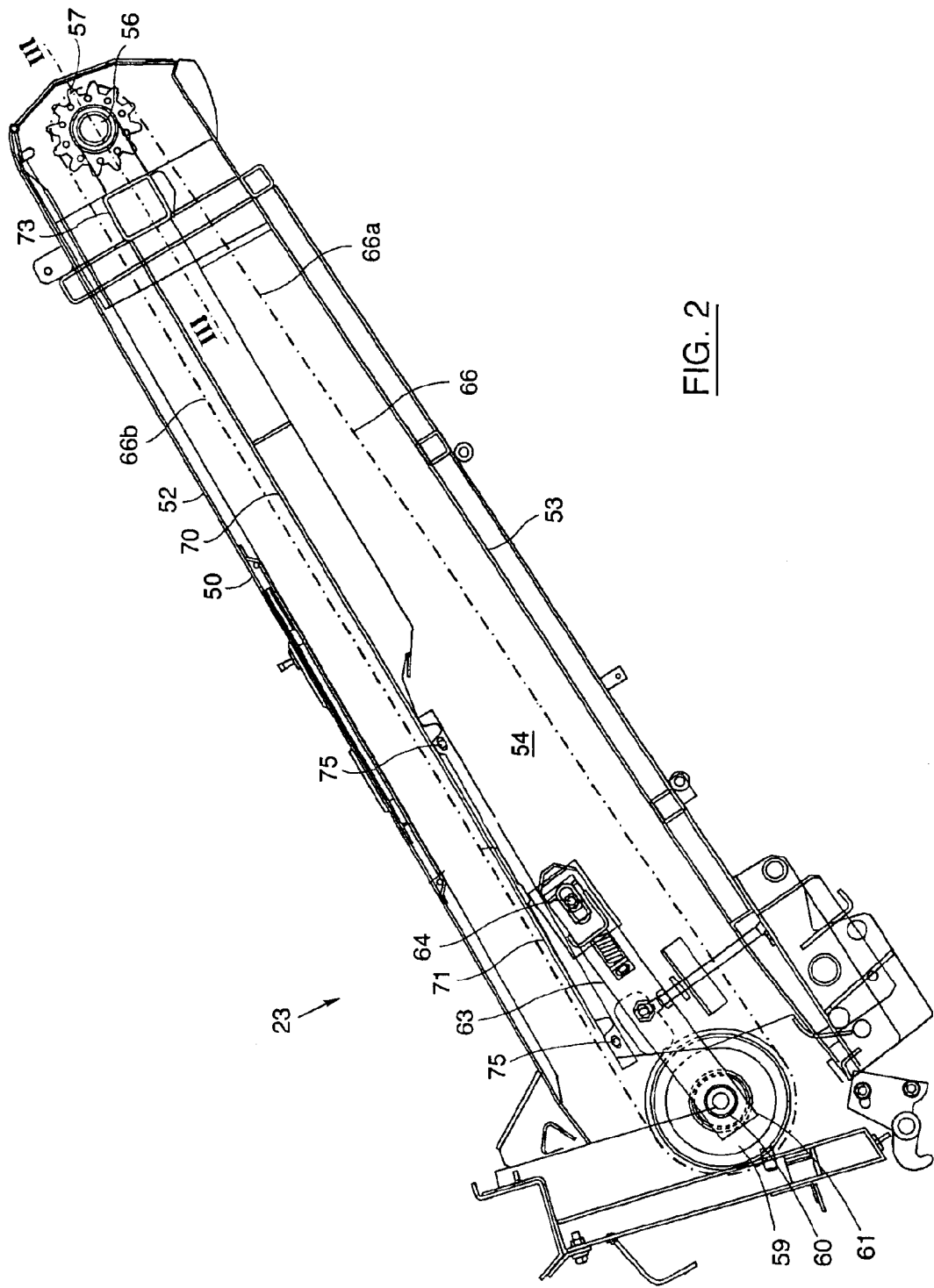
FIG. 2 is cross sectional view of the straw elevator of FIG. 1.

As shown in greater detail in FIG. 2, the straw elevator assembly 23 comprises a welded, substantially parallelepiped housing 50 which is pivotably secured to the main frame 11 below the operator's platform 14. The housing 50 comprises an upper wall 52 and a lower wall 53, interconnected by a pair of side walls 54. The rear end of the housing 50 is provided with a transverse drive shaft 56 which extends through the side walls 54 and is provided with a plurality of (e.g. four) sprockets 57. At the front end of the elevator assembly 23, a drum 59 is installed for rotation between the side walls 54. The drum has a front shaft 60 extending through apertures in the side walls and received in bearings 61 which are mounted to pivot arms 63. At their rear ends these arms 63 are pivotably affixed to the outside of the side walls 54 at pivots 64.

The elevator assembly 23 includes elevator mechanism comprising a plurality of endless, flexible members, e.g. chains 66, which are trained along parallel paths over the sprockets 57 and the front drum 59. The chains are driven by the sprockets 57 on the drive shaft 56. Mounted across and to the chains is a plurality of generally transverse slats.

The lower wall 53 of the housing 50 may be provided with a wear plate along which the lower run 66a of the elevator mechanism conveys the harvested crop to the inlet of the threshing and separating assembly 16. During operation of the elevator assembly 23, the drive shaft 56 is rotated CCW as seen in FIG. 2 to make the slats adjacent the front drum 59 engage and grab the crop material which is delivered thereto by the header auger 25. The slats of the lower run 66a convey the crop rearwardly and upwardly along the lower wall 53 or the wear plate, if present, to the outlet of housing 50, where the crop is combed away from the elevator mechanism by the front portion of the threshing rotor 27.

In order to prevent that stray material that was not removed immediately from the elevator mechanism, falls back from the upper run 66b onto the lower run 66a and starts wrapping around the drive shaft 56 or accumulating around the sprockets 57, an intermediary shielding mechanism is provided between the lower and upper runs 66a, 66b of the elevator mechanism. In the present embodiment, the shielding mechanism consists of a stationary rear plate 70 and a removable front plate 71. The rear plate 70 is welded between and to the side walls 54 and to a transverse tubular reinforcement 73 disposed near the drive sprockets 57. The front plate 71 extends forwardly from the front edge of the rear plate 70 towards the front drum 59 and is attached by bolt mechanism 75 to the side walls 54 of the housing 50.

Figure 3:
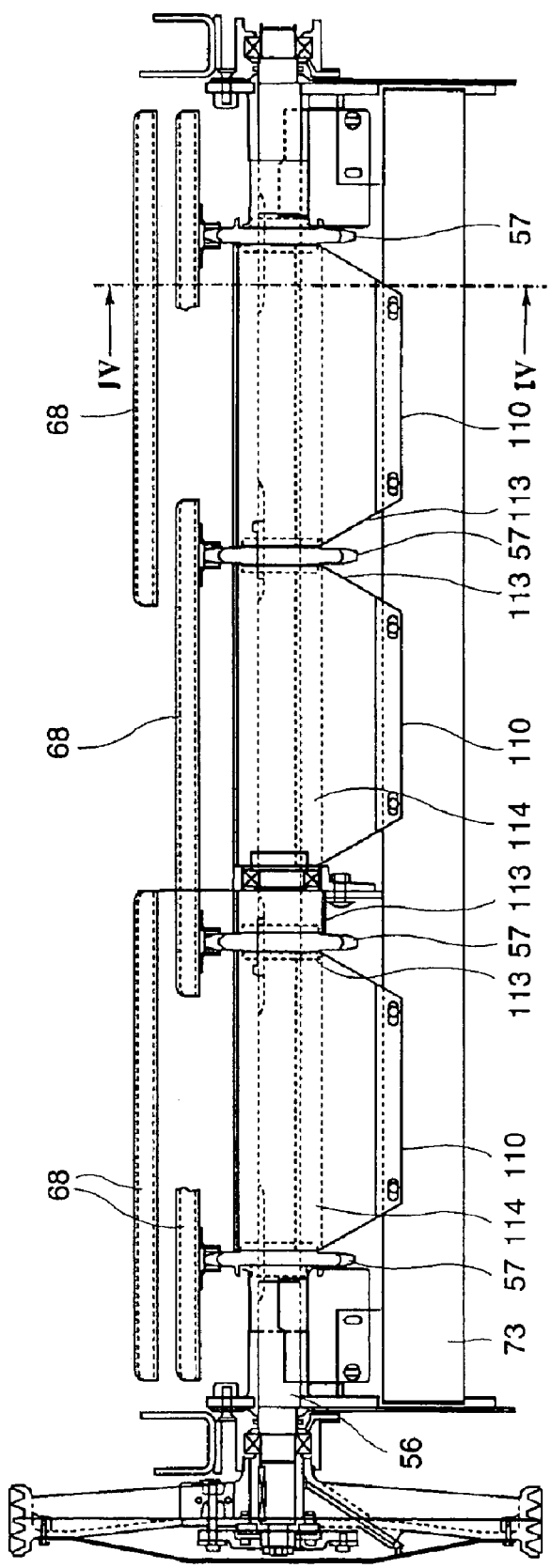
FIG. 3 is a view of the rear section of the straw elevator taken along line III—III in FIG. 2.
Figure 4:
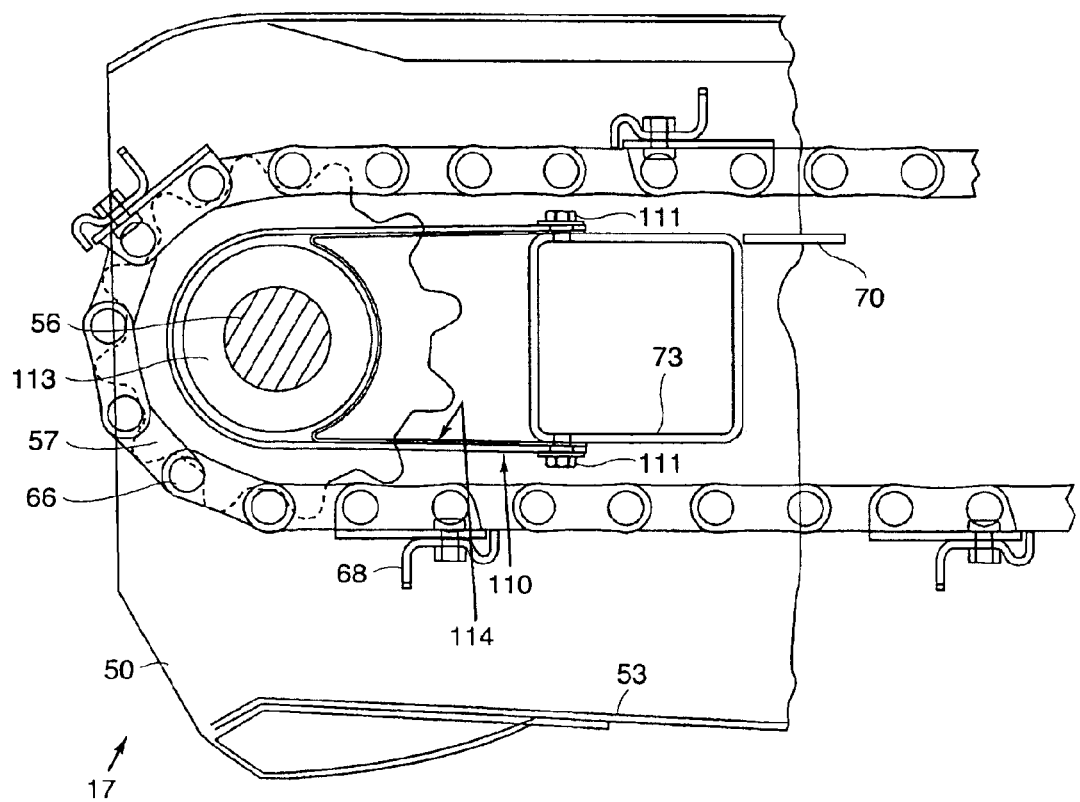
FIG. 4 is a cross sectional view of the straw elevator, taken along line IV—IV in FIG. 3.

As shown in FIGS. 3 and 4, the rear portion of the elevator assembly 23 is equipped with mechanism for preventing wrapping of crop material around the drive shaft 56. The space between the sprockets 57 is shielded from the path of the conveyor mechanism by outer shaft shielding plates 110 which have a generally U-shaped cross section and extend over the drive shaft 56. The upper and lower parts of the plates 110 are attached by bolts 111 to the transverse tubular reinforcement 73 of the elevator housing 50. At their sides the shielding plates 110 extend over and close to the side flange portions 113 of the sprockets 57 such that crop material cannot easily penetrate between the rear of the sprockets 57 and the plates 110. Thus is shielded the rear face of the shaft 56.

Within these outer shielding plates are mounted inner shaft shielding plates 114 which shield the front face of the drive shaft 56. These inner plates 114 have a generally W-shaped cross section, presenting two straight portions which are arranged along the straight portions of the outer plates 110 and an inwardly curved middle portion which has its centre of curvature at the centre of the shaft 56. During assembly, first the inner shielding plate 114 is slid over the tubular reinforcement 73, then the outer shielding plate 110 is mounted over the drive shaft 58 and the inner shielding plate 114 and finally both shielding plates are affixed to the tubular reinforcement 73 by the same bolts 111.

Also the sides of the curved portion 114 extend over and close to the side flange portions 113 of the sprockets 57. Together, the curved portions of the inner and outer shielding plates 114, 110 form a cylindrical chamber around the shaft 56, which prevents that the rotating shaft contacts and pulls along long-stemmed crop material.

The straight portions of the shielding plates have a trapezoidal shape, with the smaller side mounted to the tubular reinforcement 73. In this manner the teeth of the sprockets 57 pass at a substantial distance from the side edges of the shielding plates 110, 114. Thus is prevented that there is constant friction of crop material between the sprockets 57 and the edges of these shielding plates.

Although the present invention has been described with reference to a particular machine and structure, other embodiments can be thought of without departing however from the scope of the invention as defined in the claims. For instance, the inner plate may be provided it outwardly extending lips for hooking over the edge of the outer plate. This arrangement makes it possible to keep both plates in place while only attaching the outer plate to the elevator frame.

What is claimed is:

1. An agricultural harvesting machine comprising a crop processing mechanism and an elevator assembly for conveying harvested crop material to said crop processing mechanism, said elevator assembly comprising:
   an elevator housing;
   an endless elevator mechanism mounted for rotation in said housing over a shaft; and
   an outer shaft shielding plate mounted over said shaft for preventing migration of crop material to said shaft;
   wherein said elevator assembly further comprises an inner shaft shielding plate mounted within said outer shielding plate; and
   wherein said outer shaft shielding plate has a substantially U-shaped cross section and said inner shaft shielding plate has a substantially W-shaped cross section.

2. An agricultural harvesting machine according to claim 1, wherein said outer shielding plate and inner shielding plate co-operate to form a substantially cylindrical chamber around said shaft.

3. An agricultural harvesting machine according to claim 1, wherein both said outer and said inner shielding plates are attached to a transverse member of said housing.

4. An agricultural harvesting machine according to claim 1, wherein both said outer and said inner shielding plates are attached simultaneously to a transverse housing member by a common bolt.

* * * * *